US012061615B2

(12) United States Patent
Zhao et al.

(10) Patent No.: US 12,061,615 B2
(45) Date of Patent: *Aug. 13, 2024

(54) RANKING AND PRESENTING SEARCH ENGINE RESULTS BASED ON CATEGORY-SPECIFIC RANKING MODELS

(71) Applicant: Home Depot Product Authority, LLC, Atlanta, GA (US)

(72) Inventors: Rongkai Zhao, Kildeer, IL (US); Rajdeep Mondal, Alpharetta, GA (US); Ravi Sambhu, Alpharetta, GA (US); Naveen Krishna, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,933

(22) Filed: Mar. 17, 2023

(65) Prior Publication Data

US 2023/0334054 A1 Oct. 19, 2023

Related U.S. Application Data

(63) Continuation of application No. 17/149,350, filed on Jan. 14, 2021, now Pat. No. 11,609,920, which is a continuation of application No. 15/933,817, filed on Mar. 23, 2018, now Pat. No. 10,915,538.

(51) Int. Cl.
| | | |
|---|---|---|
| G06F 16/245 | (2019.01) | |
| G06F 16/2457 | (2019.01) | |
| G06F 16/28 | (2019.01) | |
| G06F 16/951 | (2019.01) | |
| G06Q 30/0601 | (2023.01) | |

(52) U.S. Cl.
CPC .. *G06F 16/24578* (2019.01); *G06F 16/24575* (2019.01); *G06F 16/285* (2019.01); *G06F 16/951* (2019.01); *G06Q 30/0641* (2013.01)

(58) Field of Classification Search
CPC ........... G06G 16/24578; G06G 16/285; G06G 16/24575; G06G 16/951
See application file for complete search history.

(56) References Cited

U.S. PATENT DOCUMENTS

| | | | |
|---|---|---|---|
| 8,086,631 | B2 | 12/2011 | Gollapudi et al. |
| 8,244,651 | B1 | 8/2012 | Lin |
| 8,301,764 | B2 | 10/2012 | Konig et al. |
| 8,898,169 | B2 | 11/2014 | Gokturk et al. |
| 2003/0033347 | A1 | 2/2003 | Bolle |

(Continued)

OTHER PUBLICATIONS

ISA / US, International Search Report and Written Opinion issued on Int'l Appl. No. PCT/US19/21983, mailed on Jun. 10, 2019, 14 pgs.

(Continued)

*Primary Examiner* — Baoquoc N To
(74) *Attorney, Agent, or Firm* — Greenberg Traurig, LLP

(57) ABSTRACT

Methods of operating a search engine may include calculating multi-modal document vector models for each of a plurality of electronic documents, training category-specific, search query-specific ranking models with respective machine learning algorithms based on those document vector models, and applying each of those models to further instances of the same search query to rank the documents responsive to that search query.

20 Claims, 6 Drawing Sheets

(56) References Cited

U.S. PATENT DOCUMENTS

| | | |
|---|---|---|
| 2004/0158569 A1 | 8/2004 | Evans |
| 2004/0215606 A1 | 10/2004 | Cossock |
| 2005/0060290 A1 | 3/2005 | Herscovici et al. |
| 2007/0174257 A1 | 7/2007 | Howard |
| 2010/0082639 A1 | 4/2010 | Li et al. |
| 2012/0078825 A1 | 3/2012 | Kulkarni |
| 2013/0097146 A1 | 4/2013 | Lanphear et al. |
| 2013/0282713 A1 | 10/2013 | Lawrence |
| 2014/0297476 A1* | 10/2014 | Wang .................... G06F 16/335 705/26.62 |
| 2016/0335697 A1 | 11/2016 | Bawri et al. |
| 2019/0286656 A1 | 9/2019 | Yerva et al. |

OTHER PUBLICATIONS

Jamie Appleseed, Faceted Sorting—A New Method for Sorting Search Results, UX Research Articles, Sep. 2, 2014, < https://baymard.com/blog/faceted-sorting >, 18 pgs.

Changsung Kang et al., Predicting Primary Categories of Business Listings for Local Search, Yahoo! Labs, Sunnyvale, CA 4 pgs.

Tie-Yan Liu, Learning to Rank for Information Retrieval, Foundations and Trends in Information Retrieval, vol. 3, No. 3 (2009), 109 pgs.

Office Action from Mexican application No. MX/a/2020/009560, mailed Oct. 27, 2023, 9 pp.

Office Action from Mexican application No. MX/a/2020/009560, dated Feb. 20, 2024, 12 pp.

\* cited by examiner

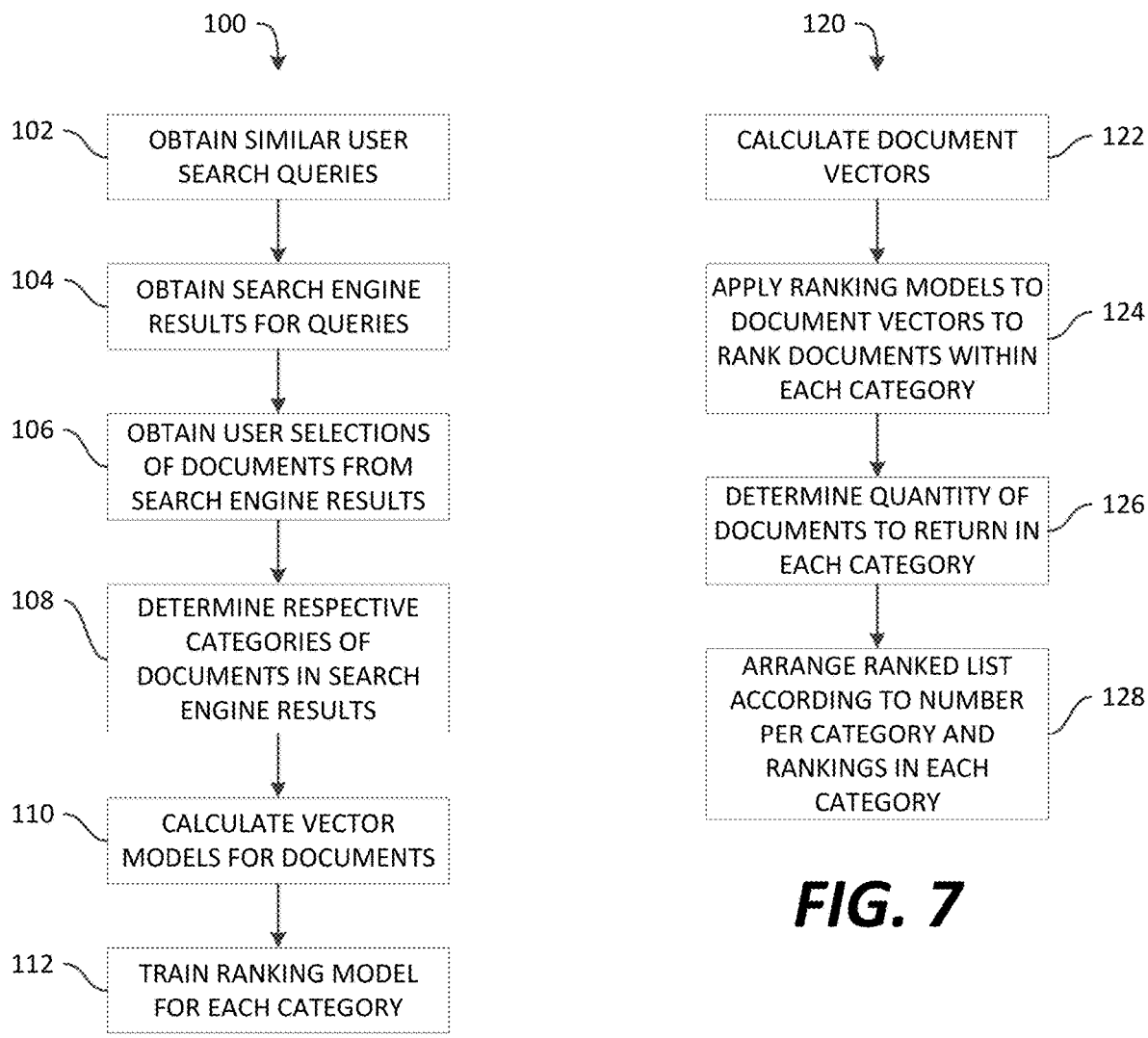

RANKING AND PRESENTING SEARCH ENGINE RESULTS BASED ON CATEGORY-SPECIFIC RANKING MODELS

CROSS-REFERENCE TO RELATED APPLICATION

This application is a continuation of U.S. patent application Ser. No. 17/149,350, filed on Jan. 14, 2021, and titled "RANKING AND PRESENTING SEARCH ENGINE RESULTS BASED ON CATEGORY-SPECIFIC RANKING MODELS," granted as U.S. Pat. No. 11,609,920, which is a continuation of U.S. patent application Ser. No. 15/933,817, filed on Mar. 23, 2018, and titled "RANKING AND PRESENTING SEARCH ENGINE RESULTS BASED ON CATEGORY-SPECIFIC RANKING MODELS," granted as U.S. Pat. No. 10,915,538, the entirety of which are hereby incorporated by reference.

FIELD OF THE DISCLOSURE

This disclosure is generally directed to ranking and presenting ranked results from a search engine, including ranking results by training and applying multiple category-specific ranking models to a particular search query.

BACKGROUND

In known search engines, results are generally ranked by relevance, which may be calculated based on a similarity of the text of the search query to one or more text portions (e.g., the title) of the searched electronic documents. Once the results are returned to the user, the user is generally given the option to sort the results according to one or more criteria, such as price, color, brand, etc.

SUMMARY

An embodiment of a method of operating a search engine for a plurality of electronically-readable documents, each document associated with a respective category selected from a plurality of categories, may include receiving a search query from a user, executing a search on the plurality of documents based on the search query to generate a set of responsive documents, the set of responsive documents comprising a first subset of one or more documents associated with a first category and a second subset of one or more documents associated with a second category, and ranking the responsive documents within the set. Ranking the responsive documents may include applying a first ranking model to the set of responsive documents to create a first ordered sub-list, the first ranking model associated with the first category, and applying a second ranking model to the set of responsive documents to create a second ordered sub-list, the second ranking model associated with the second category. The method may further include creating an ordered list of documents according to the first ordered sub-list and the second ordered sub-list, wherein an initial subpart of the ordered list comprising at least a highest-ranked document from the first ordered sub-list and at least a highest-ranked document from the second ordered sub-list, and returning the ordered list to the user responsive to the search query.

An embodiment of a method of operating a search engine for a plurality of electronically-readable documents may include obtaining a set of user search queries to a search engine, wherein each user search query in the set of user search queries is the same as or similar to each other user search query in the set of user search queries. The method may further include obtaining a respective list of documents returned by the search engine responsive to each user search query in the set of user search queries, obtaining a set of user selections of one or more of the documents in each respective list so as to associate respective user selections of documents with respective user search queries, determining that a first subset of the documents within the set of documents are associated with a first category, and determining that a second subset of the documents within the set of documents are associated with a second category. The method may further include training a first document ranking model for the first category based on the respective user selections of documents associated with respective user searches, training a second document ranking model for the second category based on the respective user selections of documents associated with respective user searches, and storing the first and second document ranking models for use in ranking results of further user searches with the search engine that are similar to the set of user searches.

BRIEF DESCRIPTION OF THE DRAWINGS

FIG. 6 is a flow chart illustrating an example method of training one or more ranking models for a search query type.

FIG. 7 is a flow chart illustrating an example method of ranking a set of documents in a set of search results according to one or more ranking models and returning a set of ranked results to a user.

DETAILED DESCRIPTION

Figure 1:
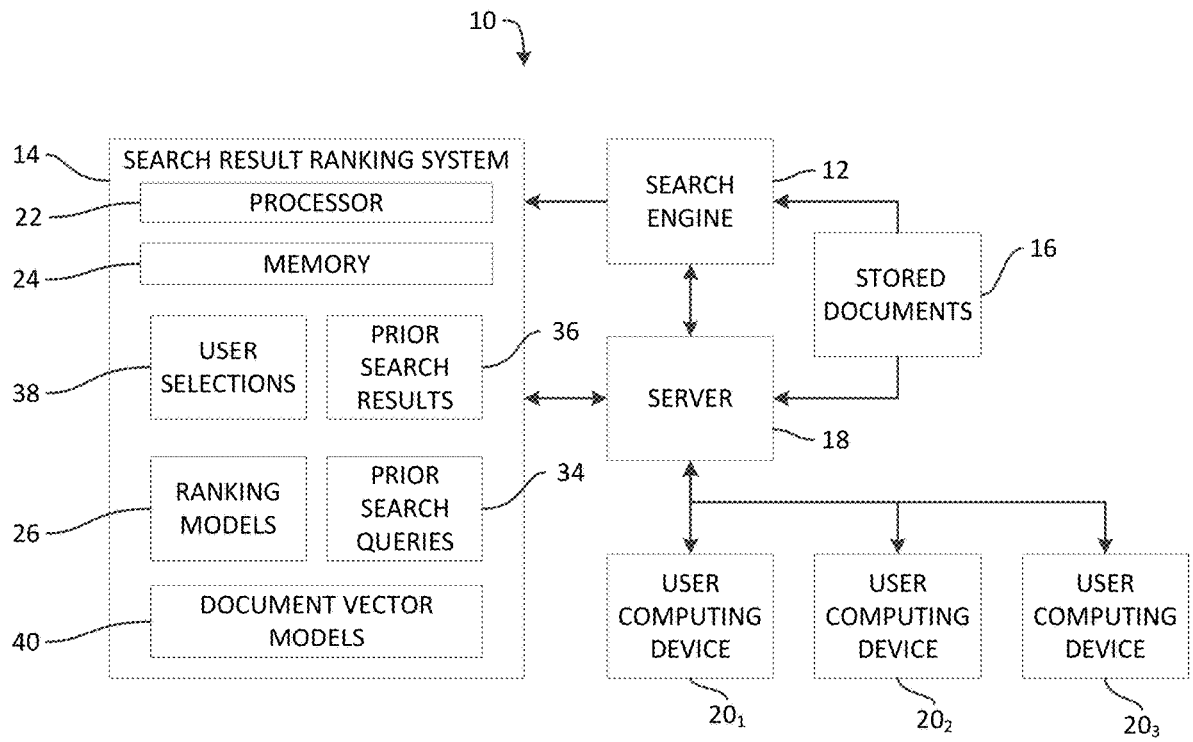
FIG. 1 is a diagrammatic view of an example system for operating a search engine for computer-readable documents.

Known methods for ranking search results (e.g., results of a search engine) generally deliver noisy results, particularly in the context of a search that may encompass many categories of responsive documents. For example, in an embodiment in which a search engine searches one or more websites for one or more products or services responsive to a user query, the responsive documents returned by the search engine may include documents respective of multiple different categories of products and/or multiple different categories of services. This may be problematic where, for example, the user's query itself does not make clear what category of responsive product or service (or other category) the user intends. For example, if a user searches for "hammer", the user may be intending to search for a tool or for a toy.

Where results of a search are ranked according to user selections responsive to previous searches—as in many search engines—multi-category search results may omit results from categories that are selected by users less often. Continuing with the "hammer" example noted above, in an embodiment of search results including both tools and toys, the toy results may be ranked far down in the results due to users generally selecting hammer tools more often than selecting hammer toys. As a result, as large number of tool hammers may be presented to the user in the search results before a single toy hammer. Accordingly, a user that intended to find a toy hammer may believe that no toy hammers were included in the search results before navigating to the portion of the results that includes the toy hammer result(s). As a result, known multi-category search results may not adequately present each category within the results.

Known algorithms, methods, and systems for ranking multi-category search results may be improved upon by providing an algorithm, method, and/or system in which category-specific rankings models may be developed and applied and, at runtime, results from two or more categories (e.g., each category) responsive to a user's search query may be presented in an initial set of search results to the user.

Known methods for sorting search results may introduce further noise into search results by including less-relevant results high on a sorted list because those results may have an extreme value for a criterion by which the list is sorted. For example, a given product may have low relevance to a search query, but may be the lowest-price item included in the results, and thus may be placed first in the list when sorted by price, even though the product may be much less relevant than other results. Such methods may be improved upon by segregating the search results into groups by relevance and rank before sorting, as described herein.

The remainder of this disclosure will describe embodiments in which a search engine executes on the products and services available from an e-commerce retailer (and thus wherein the documents searched and returned by the search engine describe respective products and services offered by that retailer) but it should be understood that the teachings of the present disclosure may find use with search engines in a wide variety of contexts, including documents not particularly associated with any product or service.

FIG. 1 is a diagrammatic view of an example system 10 for operating a search engine for computer-readable documents. The system 10 may find use, for example, with a search engine that searches for products and services on an e-commerce website. Accordingly, the documents searched and returned by the search engine may be listing pages for respective products or services, in some embodiments. The system 10 may include a search engine 12, a search result ranking system 14, a plurality of stored electronic documents (e.g., web pages) 16, a web server 18, and a plurality of user computing devices $20_1$, $20_2$, ... $20_N$ (which may be referred to individually herein as a user computing device 20 or collectively as user computing devices 20).

The stored electronic documents 16 may include a plurality of web pages that may be provided as respective parts of a single website (e.g., hosted under the same domain), in some embodiments. For example, the stored electronic documents 16 may include a plurality of product listing pages and service listing pages, each associated with a respective product or service, as well as product and service category pages, landing pages, and the like. Additionally or alternatively, the stored electronic documents 16 may include web pages not associated with any particular product or service. Additionally, in some embodiments, the stored electronic documents may include web pages associated with a plurality of different websites.

The stored documents 16 (e.g., web pages) may be associated with respective categories, in some embodiments. For example, one or more of the documents 16 may be associated with a respective entity (e.g., a respective product or service), in some embodiments. For example, a product listing page may be associated with the product listing on the product listing page, and a service listing page may be associated with the service listed on it, in an embodiment. In some embodiments, the entities with which the web pages are respectively associated may be associated with a formal categorization system. For example, a plurality of product listing pages and service listing pages may be associated with a categorization system of an e-commerce retailer that operates a website comprising the product and service listing pages.

The search engine 12 may be configured to receive a search query originating from a user computing device 20, search a plurality of computer-readable documents, and return a listing of documents responsive to the search query. For example, the search engine 12 may be configured to search product listing pages in the stored documents 16, responsive to a user search query, and return a listing of a plurality of such product listing pages responsive to the request for provision to the requesting user computing device 20.

The server 18 may be in electronic communication with the user computing devices 20 and may provide one or more websites for access by one or more user computing devices 20. For example, the server 18 may serve an e-commerce website, in some embodiments. The one or more websites served by the server 18 may include some or all of the documents 16, in an embodiment. A web site served by the server 18 may provide an interface for receiving search queries from one or more users through the user computing devices 20, and may further provide responsive results to the user computing devices 20. The server 18 may thus be in electronic communication with the search engine and may provide search queries received from user computing devices 20 to the search engine 12 and receive responsive results from the search engine 12. The responsive results may include a ranked listing of a plurality of the documents 16, in some embodiments.

The search result ranking system 14 may be configured to rank documents within a set of search results from the search engine 12. That is, the search result ranking system 14 may receive a search query that originated at a user computing device 20 (e.g., via the server 18), may receive a set of responsive results from the search engine 12, and may create a ranked order of those results for presentation to the user computer device 20. The search result ranking system 14 may include a processor 22 and a memory 24 storing instructions that, when executed by the processor 22, cause the search result ranking system 14 to perform one or more of the steps, processes, or methods of this disclosure.

The search result ranking system 14 may be configured to develop one or more category-specific ranking models 26, in an embodiment, and to apply one or more of those models to a set of search results to rank the search results according to the one or more models. In an embodiment, the search result ranking system 14 may develop and store one or more models 26 that are specific to a search or type of search (where a type of search may be a single specific search query, or a set of similar search queries that seek the same responsive information, such as "bit", "drillbit", "drill bit", etc.).

Figure 2:
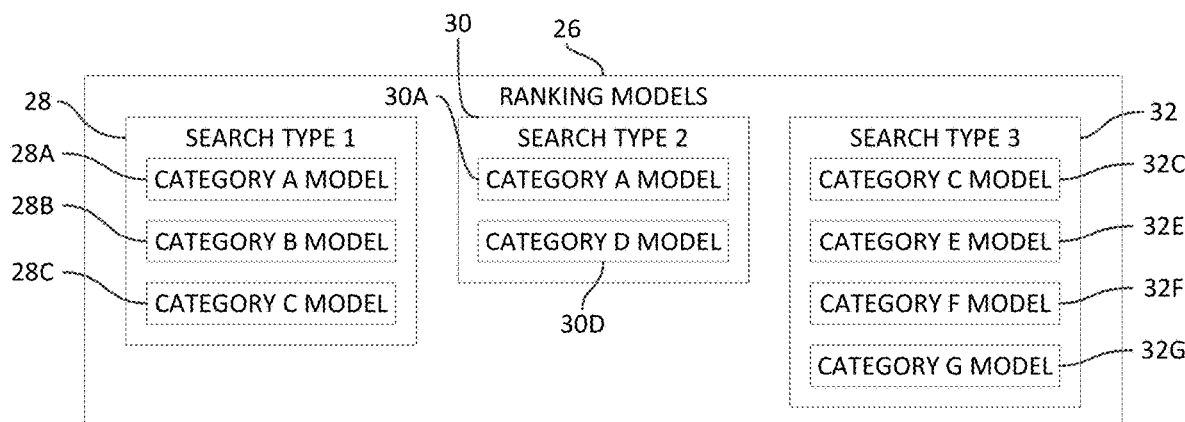
FIG. 2 is a table illustrating an example set of ranking models for a search result ranking system.

FIG. 2 is a table illustrating an example set of ranking models 26. The table illustrates an embodiment in which a plurality of models 26 are provided, each of which is specific both to a type of search and to a category. For example, as illustrated in FIG. 2, the ranking models may include three models (a Category A model 28A, a Category B model 28B, and a Category C model 28C) in a first set of models 28 for a first search type (Search Type 1), two models (a Category A model 30A and a Category D model 30D) in a second set of models 30 for a second search type (Search Type 2), and four models (a Category C model 32C, a Category E model 32E, a Category F model 32F, and a Category G model 32G) in a third set of models 32 for a third search type (Search Type 3). As generally illustrated in FIG. 2, the ranking models 26 may include one or more models, each associated with a respective category, for each of a plurality of search types. Models may be created according to the method of FIG. 6, which will be described below.

Returning to FIG. 1, in addition to the ranking models 26, the search result ranking system may further include records of prior search queries 34 conducted with the search engine 12 (e.g., prior user queries from user computing devices 20), the results of those prior searches 36, and user selections within those results 38. Accordingly, the search result ranking system 14 may include records that indicate how likely a user would have been to select a particular document (based on the user selections 38) within the results 36 responsive to a specific query (within the prior queries 34). Based on that data, the search result ranking system 14 may be configured to determine the "rank" of a given document (within the documents 16) with respect to a given search or search type and/or category, as will be described in greater detail below.

The search result ranking system 14 may further include a set of document vector models 40. In an embodiment, the document vector models 40 may include at least one vector model for each of a plurality of the documents 16. In some embodiments, each vector model in the vector models 40 may represent a single respective document in the documents 16. Accordingly, in some embodiments, a "vector model" may alternately be referred to as a "vector representation." In some embodiments, the document vector models 40 may include a respective plurality of vector models for each of one or more of the documents 16, with each model specific to a document and to a search query to which that document is responsive. The vector models 40 may be used by the ranking models 26 for ranking the documents 16 in a set of search results from the search engine 12. An example method for calculating a document vector model will be described with respect to FIG. 5.

As illustrated in FIG. 1, the search engine 12, search result ranking system 14, stored documents 16, and server 18 may be embodied in separate computing resources (e.g., processing and memory resources), in some embodiments. In other embodiments, any two or more of the search engine 12, search result ranking system 14, stored documents 16, and server 18 may be embodied in the same computing resources. Further, in some embodiments, any one of the search engine 12, search result ranking system 14, stored documents 16, or server 18 may be embodied in multiple disparate sets of computing resources.

Figure 3:
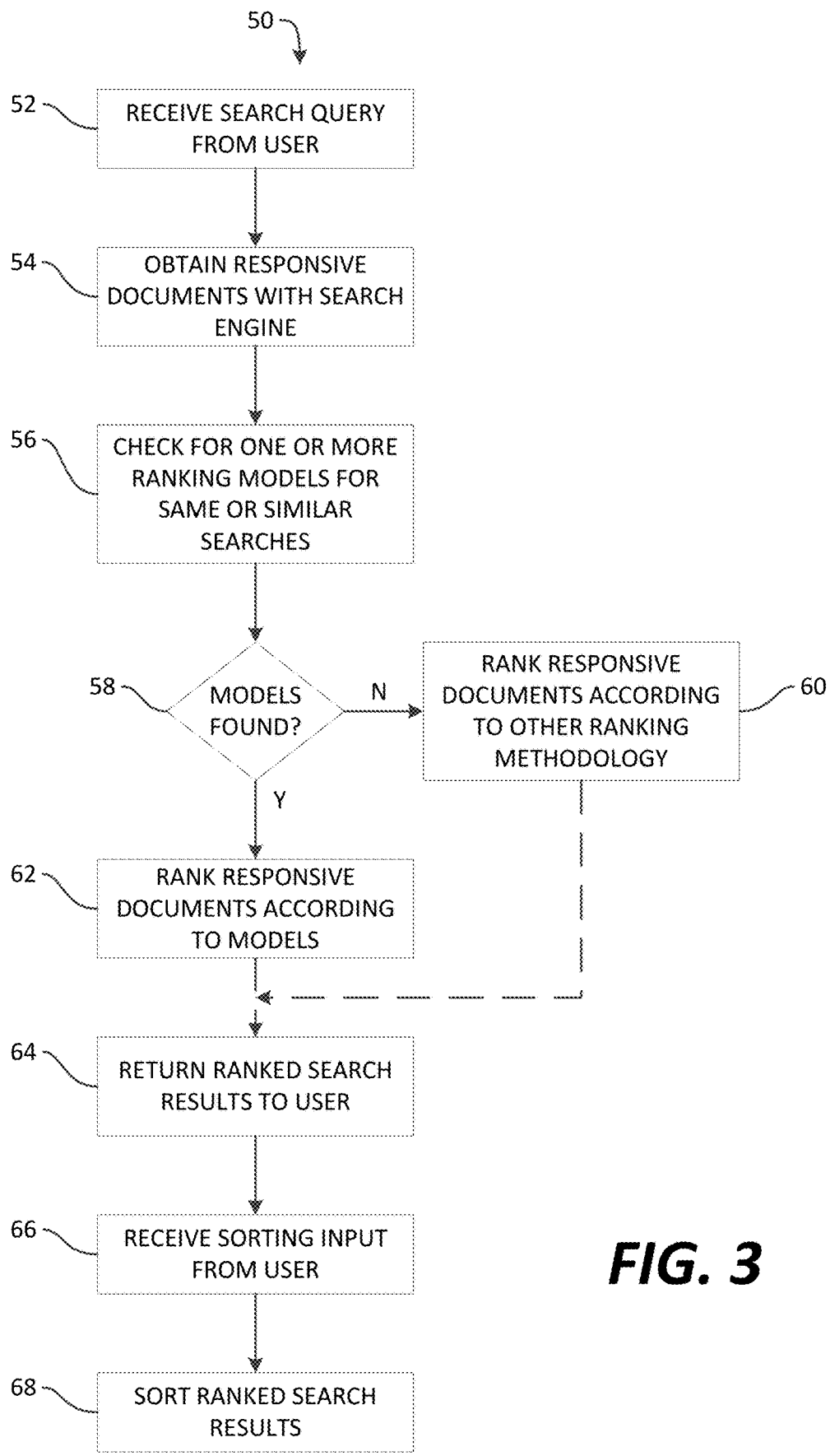
FIG. 3 is a flow chart illustrating an example method for providing ranked search results responsive to a user search request for a search engine.

FIG. 3 is a flow chart illustrating an example method 50 for providing ranked search results responsive to a user search request for a search engine. One or more steps of the method 50 may be performed by the search result ranking system 14 of FIG. 1, in an embodiment.

The method 50 may include a step 52 that includes receiving a search query from a user. The search query may be received from a user computing device, and may be received through a server, such as a server serving a web site including a search interface, for example.

The method 50 may further include a step 54 that includes obtaining responsive documents with a search engine. Step 54 may include passing the user search query to a search engine and/or using the search engine to search for responsive documents in a set of documents. For example, step 54 may include using a search engine to search for one or more web pages responsive to the search query. In a further example, step 54 may include using a search engine to search for one or more product listing pages or service listing pages on an e-commerce website responsive to the query. In an embodiment, step 54 may further include receiving the set of responsive documents from the search engine.

The method 50 may further include a step 56 that includes checking for one or more stored ranking models for the same or similar searches to the search received in step 52. Checking for one or more ranking models at step 56 may include consulting a listing of ranking models, each of which may be associated with a type of search query, for a search query that is the same as or similar to the search query received at step 52. In an embodiment, step 56 may include determining if one or more category-specific ranking models have been created and stored for the search query, or for similar queries.

The method 50 may further include a step 58 that includes querying whether any model(s) were found for the search request. If not, the method may include a step 60 that includes ranking the responsive documents according to a ranking methodology other than the methodology of this disclosure. For example, at step 60, the responsive documents may be ranked according to a known ranking methodology, such as a cosine similarity of the search query to the respective titles of the documents.

In another example, at step 60, the responsive documents may be ranked according to a unified search ranking model for all search terms and categories. In an embodiment of such a unified model, each document may be dynamically tagged with a features that indicate a match of document text with one or more portions of the search query. For example, if the search query is "16 oz sledge hammer" and the document title is "8 oz claw hammer", the document will be tagged with features and a degree of match (in this example, a binary degree of match): ["16 oz":0], ["sledge";0], ["claw":0], ["hammer":1].

If one or more models are found for the search at step 56, the method 50 may include a step 62 that includes ranking the responsive documents according to the stored ranking models. Ranking the responsive documents according to the stored ranking models may be performed according to the method of FIG. 7, in an embodiment.

The method 50 may further include a step 64 that includes returning the ranked search results to the user. For example, the ranked search results may be returned to the user computing device that was the origin of the search query.

The method 50 may further include a step 66 that includes receiving a sorting input from the user. For example, the interface in which the results are provided may include one or more radio buttons, sliders, check boxes, or other elements through which a user may provide a sorting input. The user's sorting input may be an instruction to sort the search results by one or more criteria, such as one or more characteristics of the documents, or one or more characteristics of respective entities (e.g., products or services) associated with the documents. For example, in an embodiment in which the documents are product listing pages, a user's sorting input may be an instruction to sort the documents (e.g., to sort the products) by price, by color, by size, by user review rating, and/or some other criteria.

The method 50 may further include a step 68 that includes sorting the ranked search results according to the user sorting input. In an embodiment, sorting the ranked results may include segregating documents into groups by rank before sorting, sorting within each group, and presenting the sorted results to the user by group. An example method of sorting ranked search results will be described with reference to FIG. 8.

Figure 4:
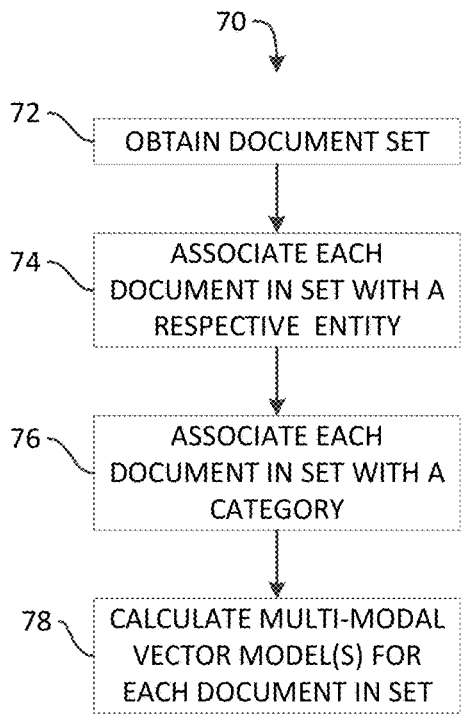
FIG. 4 is a flow chart illustrating an example method of preparing a set of computer-readable documents for ranked search results from a search engine.

FIG. 4 is a flow chart illustrating an example method 70 of preparing a set of computer-readable documents for ranked search results from a search engine. One or more aspects of the method 70 may be performed before the steps of the method 50 of FIG. 3, in an embodiment. One or more steps of the method 70 may be performed by the search result ranking system 14 of FIG. 1, in an embodiment.

The method 70 may include a step 72 that includes obtaining a document set. The document set may be or may include, for example, one or more web pages. The document set may be or may include, for example, one or more product listing pages or service listing pages on an e-commerce website. The document set may be or may include the stored documents 16 of FIG. 1, in an embodiment.

The method 70 may further include a step 74 that includes associating each document in the document set with a respective entity. For example, in an entity in which the documents include one or more product listing pages or service listing pages, the product listing pages may be associated with the respective products listed, and the service listing pages may be associated with the respective services listed. Accordingly, each product listing page may be associated with a single product, and each service listing page may be associated with a single service, in an embodiment. Associations between documents and entities may be inherent in the documents, in an embodiment, such as through the presence of information about a particular entity on the document.

The method 70 may further include a step 76 that includes associating each document in the set with a respective category. For example, a document, such as a web page, may be associated with a category in a categorization system respective of a website of which the web page is a part. In a further example, a product listing page or service listing page may be associated with a category according to a product and service categorization system respective of an e-commerce website. Each document may be associated with a multi-layered (i.e., hierarchical) category, in an example, such that each document in the set of documents is associated with a single category at any given level of the hierarchy.

The method 70 may further include a step 78 that includes calculating a multi-modal vector model for each document in the set. An example method for determining a multi-modal vector model for a document will be described with respect to FIG. 5. Respective multi-model vector models respective of a given document may be calculated in various contexts at various times, in embodiments. For example, a multi-modal vector model may be calculated for a document in the context of each time that document was selected in response to a prior user search query, as will be described with respect to FIG. 6. In another example, a multi-modal vector model may be calculated at runtime for a document when that document is included in a list of responsive documents returned by a search engine in response to a user query. In an embodiment, as will be described with respect to FIG. 5, a multi-modal vector model calculated for a document may be calculated in the context of a single search query, and thus may be based on that search query, as well as on the contents of the document itself and other information.

Figure 5:
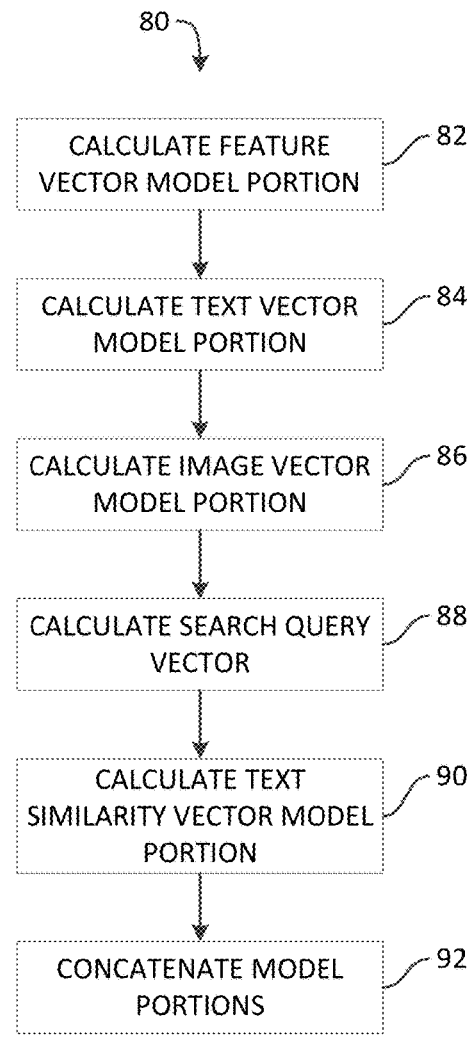
FIG. 5 is a flow chart illustrating an example method of calculating a multi-modal vector model for a document.

FIG. 5 is a flow chart illustrating an example method 80 of calculating a multi-modal vector model for a document. In an embodiment, a multi-modal vector may be calculated for each of a plurality of documents searchable by a search engine. For example, in an embodiment, a multi-modal vector model may be calculated for each of a plurality of product listing pages and/or service listing pages on an e-commerce website. One or more steps of the method 80 may be performed by the search result ranking system 14 of FIG. 1, in an embodiment.

The method may include a step 82 that includes calculating a feature vector model portion. The feature vector model portion may include calculating a vector based on one or more features of an entity associated with the document. For example, the feature vector model portion may be calculated based on one or more features that are set forth in the document itself. Additionally or alternatively, the feature vector model may be calculated based on a separately-stored and separately-cataloged set of features respective of an entity associated with the document. For example, in an embodiment in which the document is a product listing page, the feature vector model may be calculated based on a set of features respective of the product (e.g., height, width, weight, color, etc.) listed on the product listing page and/or stored in a product database separate from the product listing page.

Features may be reduced to vector values in one or more of a variety of ways. For example, for a numeric feature, like weight, the feature vector may contain the value of the weight. In another example, for a category feature, like color, the vector portion for the feature may include numerous values, such as three values (for "red", "green", and "blue"), for example. In such an example, the feature vector may be encoded using one-hot encoding, such that [0 0 1] denotes "red", [0 1 0] denotes "green" and [1 0 0] denotes "blue". A person of skill in the art will appreciate that there are many ways to reduce a feature to a vector portion.

The method 80 may further include a step 84 that includes calculating a text vector model portion. The text vector model portion may be calculated based on one or more aspects of the text content of the document, such as the title and/or a description of an entity in the document, in an embodiment. In some embodiments, two or more text vector model portions may be calculated for respective text portions, such as a first vector for the title, a second vector for a product (or other entity) description, and so on.

Text may be reduced to vector values in one or more of a variety of ways. For example, document text may be reduced to a vector using a bag-of-words method or a neural network method.

The method 80 may further include a step 86 that includes calculating an image vector model portion. The image vector model portion may be calculated based on one or more images contained in the document, in an embodiment. For example, in an embodiment, the image vector model portion may be calculated based on a primary image contained in the document. For example, in an embodiment, the image vector model portion may be calculated based on the primary image of a product on a product listing page. An image vector model portion may be calculated with a machine learning algorithm, for example, that has been trained to recognize, classify, and reduce to vector form images of a type expected in the document, in an embodiment. For example, in an embodiment, an image vector model may be calculated by inputting a primary image of a product into a machine learning algorithm that has been trained to recognize, classify, and reduce to vector form products of that type. The machine learning algorithm may be, for example, a neural network, such as a convolutional neural network.

The method 80 may further include a step 88 that includes calculating a search query vector, and a step 90 that includes calculating a text similarity vector model portion. As noted above, a multi-modal vector calculated for a document may be calculated in the context of a search query, such as a runtime query (e.g., such that the multi-modal vector model may be calculated during step 62 in response to a search query received during step 52 of FIG. 3), or such as a stored, prior query (as will be described with respect to FIG. 6). Accordingly, the search query vector calculation step 88 may include calculating a vector based on the relevant search query. Like document text, a search query may be reduced to vector values in one or more of a variety of ways. For example, a search query may be reduced to a vector using a bag-of-words method or a neural network method. The text similarity model calculation step 90 may include calculating a degree of similarity between a search query vector (e.g., calculated at step 88) and a text vector model portion (e.g., calculated at step 84.) The degree of similarity may be represented by a single number, in an embodiment. The degree of similarity may be calculated using a cosine similarity or other appropriate function or method.

The method 80 may further include a step 92 that includes concatenating the model portions to calculate a multi-modal vector model for the document. In an embodiment, the feature vector model portion (calculated at step 82), the image vector model portion (calculated at step 86), and the text similarity model portion (calculated at step 90) may be concatenated or otherwise combined to create the multi-modal vector model. In other embodiments, other combinations of vectors and vector model portions may be concatenated or otherwise combined to create the multi-modal vector model.

FIG. 6 is a flow chart illustrating an example method 100 of training one or more ranking models for one or more user searches. One or more steps of the method may be performed by the search result ranking system 14 of FIG. 1, in an embodiment.

The method 100 will be described with reference to a single search query type (e.g., Search Type 1 in FIG. 2). In operation, the method 100 may be repeated for one or more respective search query types to train one or more respective ranking models for each of those query types. That is, referring to FIGS. 2 and 6, the method 100 may have been applied for Search Type 1 to derive a Category A Model 28A, a Category B Model 28B, and a Category C model 28C, all respective of Search Type 1, and may have been applied separately to derive a Category A model 30A and a Category D model 30D, both respective of Search Type 2, and so on. In an embodiment, the Category A model 28A respective of Search Type 1 may thus be different from the Category A model 30A respective of Search Type 2, for reasons that will be apparent from the below description of the method 100 of FIG. 6.

The method 100 may include a step 102 that includes obtaining a set of similar user search queries (i.e., obtaining search queries of a given type). In an embodiment, step 102 may include obtaining search queries that seek the same information, and grouping those queries together (into a type) for the purpose of training one or more result ranking models to be used for that search query type in the future. The search queries obtained in step 102 may have been made through the same website, in an embodiment. For example, the search queries obtained in step 102 may all have been made through a particular e-commerce website. Different search queries may be determined to be sufficiently similar so as to be grouped together at step 102 into a single type through a manual process, in an embodiment. Additionally or alternatively, different search queries may be determined to be sufficiently similar so as to be grouped together at step 102 based on a number of words in common. In some embodiments, grouping search queries may include one or more operations for equating terms in different queries, such as equating singular and multiple versions of the same word, equating a common mis-spelling of a word with the correctly-spelled word, etc. The obtaining user search queries step 102 may include storing user search queries as they are entered by users, and later determining which search queries are the same as or similar to each other, in some embodiments.

The method 100 may further include a step 104 that includes obtaining search engine results for the user search queries obtained in step 102. For example, the results of a search engine utilized by an e-commerce website may be obtained and stored, in an embodiment. Obtaining and storing search results at step 104 may include storing the respective list of documents returned by the search engine to each search query obtained at step 102, in an embodiment. A search engine result for a given query may include, for example, lists of hyperlinks to particular documents that are relevant and responsive to that query.

The method 100 may further include a step 106 that includes obtaining user selections of documents from the search engine results obtained in step 104. User selections may be, for example, user clicks on hyperlinks to documents, or other means for selecting a given document from a list of documents in a search result set. As a result of steps 102, 104, and 106, user search queries, the search engine results for each of those queries, and the user selections responsive to those results may all be associated with one another, such that selected documents following a particular query may be set forth as positive examples in training a machine learning model for that query, and unselected documents for a query may be set forth as negative examples in a machine learning model for that query.

The method 100 may further include a step 108 that includes determining one or more categories associated with the documents included in the search results obtained in step 104. Documents may be associated with categories based on a categorical taxonomy associated with a custodian of the documents. For example, in an embodiment in which the search queries obtained in step 102 were made through an e-commerce website, the results obtained in step 104 were provided to users through the e-commerce website, and the user selections obtained in step 106 were made through the e-commerce website, the category taxonomy may be associated with the e-commerce retailer, and may categorize products and services, with each document describing a given one of those products and services. For example, in an embodiment, the documents may be product listing pages for products sold by a home improvement retailer, and category options for those products may be "Tools," "Kitchen," "Bathroom," "Outdoor," "Plumbing," "Electrical," etc. In an embodiment, the categories with which documents are associated may be at the same level of a taxonomy, whether that is the highest level, the lowest level, or an intermediate level. In an embodiment, each document may be associated with a single respective category at any given level of the taxonomy.

The method 100 may further include a step 110 that includes calculating one or more vector models for one or more documents. In an embodiment, a respective vector model may be calculated for each document included in each of the search results obtained in step 106 relative to each of the search queries in response to which that document was returned by the search engine. Accordingly, multiple different vector models may be calculated for a given document, each based on a particular search query. A vector model may be calculated according to the method 80 of FIG. 5, in an embodiment.

The method 100 may further include a step 112 that includes training a ranking model for each category determined in step 108. A ranking model may be trained using a machine learning algorithm, in an embodiment. For example, a machine learning algorithm such as RankSVM, Gradient Boosted Decision Trees, and the like may be applied. Positive examples for the machine learning algorithm may be defined by the user-selected documents within the category, in an embodiment. Negative examples for the machine learning algorithm may be defined by documents included in the search results obtained at step 106 that were not selected by a user, in an embodiment. It should be noted that, because the search queries obtained at step 102 may be of a single type, the ranking models trained at step 112 may be specific to that search query type. Thus, as noted above, the method 100 may be repeated for different search query types to train models specific to each of those query types.

FIG. 7 is a flow chart illustrating an example method 120 of ranking a set of documents in a search result set according to one or more ranking models. The method 120 may find use as step 62 in the method 50 of FIG. 3, in an embodiment. One or more steps of the method 120 may be performed by the search result ranking system 14 of FIG. 1, in an embodiment.

The method 120 may include a step 122 that includes calculating respective document vectors for one or more of the documents included the search result set. In an embodiment, a respective document vector may be calculated for each document included in the search result set. Each document vector may be calculated based on the search query to which the search result set is responsive, in an embodiment. A document vector may be calculated as set forth with respect to the method 80 of FIG. 5, in an embodiment.

The method 120 may further include a step 124 that includes applying one or more ranking models to the respective document vectors associated with the documents. In an embodiment in which multiple ranking models exist for the search query to which the search results are responsive, each of those ranking models may be applied to each of the document vectors to create a separate ranking according to each model. In an embodiment in which ranking models are associated with respective categories, each of those ranking models may be applied to the documents to create a separate ranking associated with each category. Referring to FIGS. 2 and 7, if the search query that gave rise to the search results considered in the method 120 is of Search Type 3 of FIG. 2, then the four models—the Category C model 32C, the Category E Model 32E, the Category F Model 32F, and the Category G model 32G—associated with Search Type 3 may be applied to the search results to create four separate rankings. In some embodiments, although each of the applied models may be category-specific, each of those models may be applied to all responsive documents, including documents within the model's category and documents in other categories. In such embodiments, the Category C model 32C may thus be applied to documents associated with Categories C, E, F, and G, as may the Category E Model 32E, the Category F Model 32F, and the Category G Model 32G. Each of those separate rankings result in a sub-list of the documents associated with a given category—i.e., a Category C Model sub-list, a Category E Model sub-list, a Category F Model sub-list, and a Category G Model sub-list. As will be described below, portions of each of those sub-lists may be combined with each other in an initial set of ranked results returned to the user.

The result of applying a given model to the documents may be a respective score for each of the documents with respect to that model (and, accordingly, the category with which the model is associated) that is representative of a relevance (e.g., a goodness of fit) of the document to the model. The documents may be ordered according to that relevance score within a given sub-list.

The method may further include a step 126 that includes determining a quantity of documents from each of one or more categories (e.g., each of one or more of the sub-lists) to present to the user in the initial set of ranked results. The quantity of documents for a given category may be proportional to the number of documents from that category that were included in the search results, in an embodiment. Referring again to the example of Search Type 3 from FIG. 2, if a specific set of results from the search engine for a search within Search Type 3 includes fifty percent documents in Category C, thirty percent documents in Category E, fifteen percent documents in Category F, and five percent documents in Category G, then the initial set of ranked results may include the same percentages from the model associated with those categories. That is, if total search results from the search engine include one hundred documents, and the initial set of ranked results includes twenty documents, then the initial set of ranked results may include ten documents from the Category C Model (fifty percent of twenty documents), six documents from the Category E Model (thirty percent of twenty documents), three documents from the Category F Model (fifteen percent of twenty documents), and one document from the Category G Model (five percent of twenty documents). The size of the initial set of ranked results may be set as desired for a given embodiment.

The method 120 may further include a step 128 that includes arranging the ranked list of documents (e.g., the documents in the initial set of ranked documents) according to the quantities determined in step 126 and according to the category-specific rankings determined in step 124. For example, the arranging step 128 may include creating an initial set of ranked results. As noted above, the initial set of ranked results may include a subset of the total results returned by the search engine (e.g., twenty of the one hundred documents that were returned by the search engine, for example). Continuing the example given above, an initial set may include: (i) the ten highest-ranked documents from the Category C Model sub-list; (ii) the six highest-ranked documents from the Category E Model sub-list; (iii) the three highest-ranked documents from the Category F Model sub-list; and (iv) the one highest-ranked document from the Category G Model sub-list.

The various documents from the various models may be inter-ranked—that is, ranked with respect to one another—and sorted accordingly. For example, as noted above, each document may have a score relative to each model. The documents in the initial list may be ranked and sorted by score relative to each other document in the initial list, in an embodiment. Alternatively, in an embodiment, the top documents from each category may be presented separately from each other (e.g., such that the highest-ranked documents from one model are presented, then the highest-ranked documents from another model, and so on).

Figure 8:
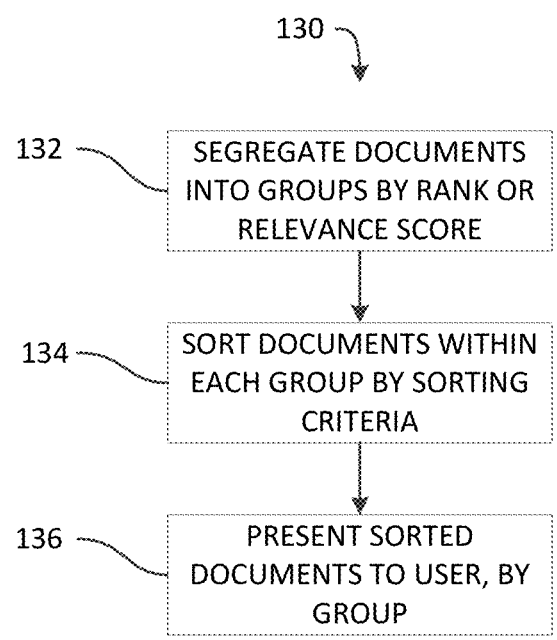
FIG. 8 is a flow chart illustrating an example method of sorting a ranked listing of search results.

FIG. 8 is a flow chart illustrating an example method 130 of sorting a ranked set of search results based on one or more sorting criteria, such as a criterion provided in a user sorting input. The method 130 may be applied, for example, to sort a set of search results ranked according to the method 120 of FIG. 7, for example. The method 130 may find use as step 68 of the method 50 of FIG. 3, for example. One or more steps of the method 130 may be performed by the search result ranking system 14 of FIG. 1, in an embodiment.

The method 130 may include a step 132 that includes segregating the documents into groups by rank or relevance score. For example, the segregating step 132 may include segregating the documents into two or more groups by rank such as, for example, a higher-ranked half, and a lower-ranked half, or an upper-ranked third, a middle-ranked third, and a lower-ranked third, and so on.

In an embodiment, segregating the documents by rank may include grouping all documents within a certain score range of the highest score for a model into a first group, and all other documents into a second group. For example, all documents having a score for a model that is at least half as high as the highest-scoring document for that model may be placed in a first group, and all other documents may be placed in a second group. In an embodiment in which multiple models were applied to derive the ranked results, all documents within a certain score range of the highest-scoring document for any model may be included in the first group (e.g., such that all documents having a score for a first model that is at least half as high as the highest-scoring document for that first model are included in the first group, as are all documents having a score for a second model that is at least half as high as the highest-scoring document for that second model, etc.).

The method 130 may further include a step that includes sorting the documents within each group according to the sorting criteria. For example, if the sorting criterion is "price," and the search results are segregated into a first group and a second group in step 132, the documents in the first group may be sorted by price (from highest price to lowest, or vice-versa) relative to each other, and the documents in the second group may be sorted by price relative to each other.

The method 130 may further include presenting the sorted documents by group. For example, in an embodiment, the sorted documents in the first group may be presented first, with the sorted documents in the second group below or after the sorted documents in the first group, and so on. Accordingly, the lower-ranked documents (in second and later groups) are presented after the higher-ranked documents in the first group, yet the documents are generally sorted according to the sorting criteria indicated by the user.

The method 130 of FIG. 8 may improve upon known methods for sorting search results by reducing noise—that is, less relevant results—in sorted results. By segregating the documents by rank, relevance score, etc., before sorting, the method places less relevant results later in the sorted results, preventing those less-relevant results from being presented early or high in the results by virtue of matching the sorting criteria well, even though those results may not match the original search query as well as other results.

Figure 9:
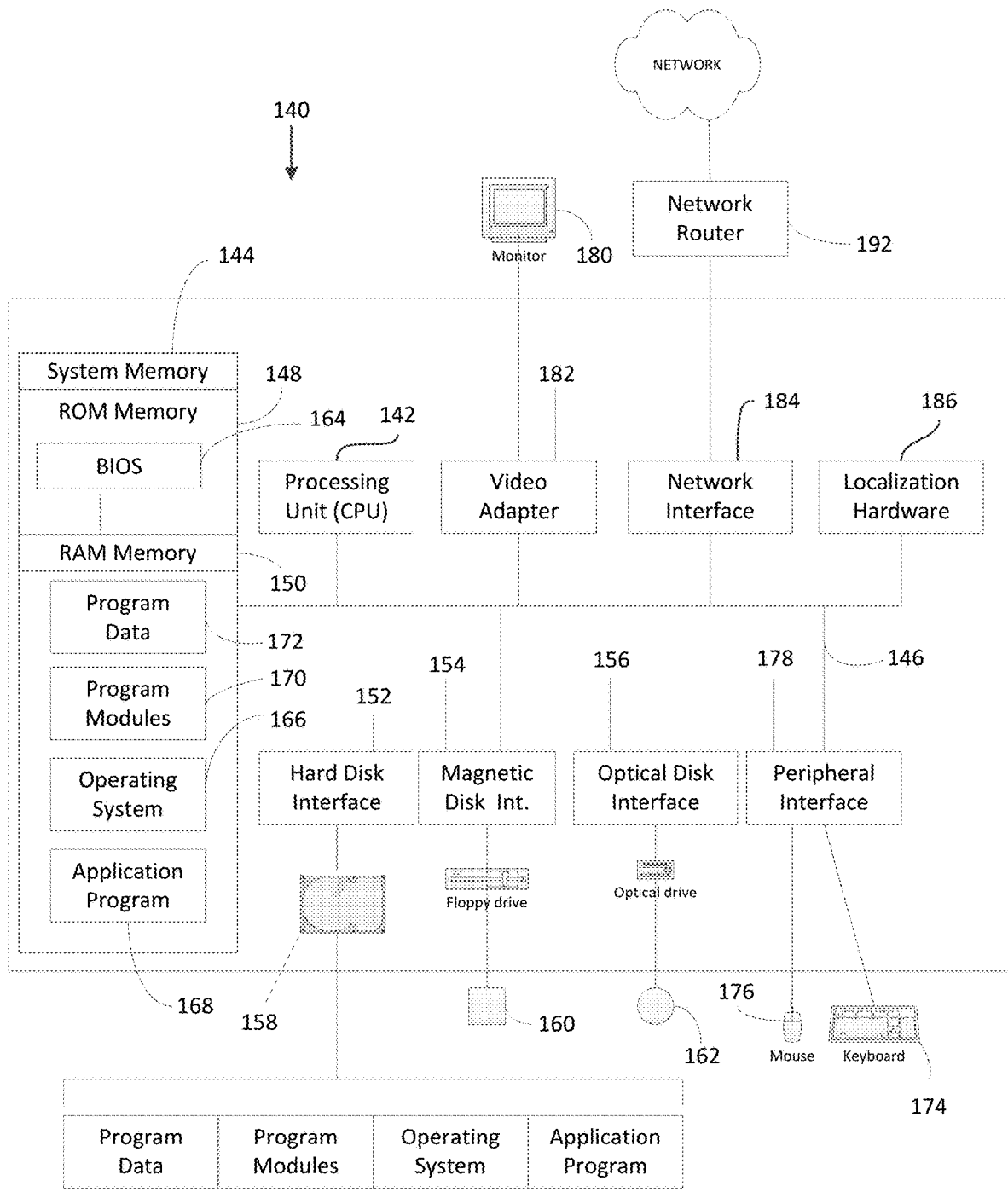
FIG. 9 is a diagrammatic view of an example embodiment of a user computing environment.

FIG. 9 is a diagrammatic view of an illustrative computing system that includes a general purpose computing system environment 140, such as a desktop computer, laptop, smartphone, tablet, or any other such device having the ability to execute instructions, such as those stored within a non-transient, computer-readable medium. Furthermore, while described and illustrated in the context of a single computing system 140, those skilled in the art will also appreciate that the various tasks described hereinafter may be practiced in a distributed environment having multiple computing systems 140 linked via a local or wide-area network in which the executable instructions may be associated with and/or executed by one or more of multiple computing systems 140.

In its most basic configuration, computing system environment 140 typically includes at least one processing unit 142 and at least one memory 144, which may be linked via a bus 146. Depending on the exact configuration and type of computing system environment, memory 144 may be volatile (such as RAM 150), non-volatile (such as ROM 148, flash memory, etc.) or some combination of the two. Computing system environment 140 may have additional features and/or functionality. For example, computing system environment 140 may also include additional storage (removable and/or non-removable) including, but not limited to, magnetic or optical disks, tape drives and/or flash drives. Such additional memory devices may be made accessible to the computing system environment 140 by means of, for example, a hard disk drive interface 152, a magnetic disk drive interface 154, and/or an optical disk drive interface 156. As will be understood, these devices, which would be linked to the system bus 146, respectively, allow for reading from and writing to a hard disk 158, reading from or writing to a removable magnetic disk 160, and/or for reading from or writing to a removable optical disk 162, such as a CD/DVD ROM or other optical media. The drive interfaces and their associated computer-readable media allow for the nonvolatile storage of computer readable instructions, data structures, program modules and other data for the computing system environment 140. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 140.

A number of program modules may be stored in one or more of the memory/media devices. For example, a basic input/output system (BIOS) 164, containing the basic routines that help to transfer information between elements within the computing system environment 140, such as during start-up, may be stored in ROM 148. Similarly, RAM 130, hard drive 158, and/or peripheral memory devices may be used to store computer executable instructions comprising an operating system 166, one or more applications programs 168 (such as the search engine or search result ranking system disclosed herein), other program modules 170, and/or program data 172. Still further, computer-executable instructions may be downloaded to the computing environment 160 as needed, for example, via a network connection.

An end-user may enter commands and information into the computing system environment 140 through input devices such as a keyboard 174 and/or a pointing device 176. While not illustrated, other input devices may include a microphone, a joystick, a game pad, a scanner, etc. These and other input devices would typically be connected to the processing unit 142 by means of a peripheral interface 178 which, in turn, would be coupled to bus 146. Input devices may be directly or indirectly connected to processor 142 via interfaces such as, for example, a parallel port, game port, firewire, or a universal serial bus (USB). To view information from the computing system environment 140, a monitor 180 or other type of display device may also be connected to bus 146 via an interface, such as via video adapter 182. In addition to the monitor 180, the computing system environment 140 may also include other peripheral output devices, not shown, such as speakers and printers.

The computing system environment 140 may also utilize logical connections to one or more computing system environments. Communications between the computing system environment 140 and the remote computing system environment may be exchanged via a further processing device, such a network router 192, that is responsible for network routing. Communications with the network router 192 may be performed via a network interface component 184. Thus, within such a networked environment, e.g., the Internet, World Wide Web, LAN, or other like type of wired or wireless network, it will be appreciated that program modules depicted relative to the computing system environment 140, or portions thereof, may be stored in the memory storage device(s) of the computing system environment 140.

The computing system environment 140 may also include localization hardware 186 for determining a location of the computing system environment 140. In embodiments, the localization hardware 186 may include, for example only, a GPS antenna, an RFID chip or reader, a WiFi antenna, or other computing hardware that may be used to capture or transmit signals that may be used to determine the location of the computing system environment 140.

The computing environment 140, or portions thereof, may comprise one or more of the user computing devices 20 of FIG. 1, in embodiments. Additionally, or alternatively, some or all of the components of the computing environment 140 may comprise embodiments of the search engine 12, the search result ranking system 14, a database or other store for the documents 16, and/or the server 18, in embodiments.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention. It should be borne in mind, however, that these terms are to be interpreted as referencing physical manipulations and quantities and are merely convenient labels that should be interpreted further in view of terms commonly used in the art.

Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

Several methods, processes, and algorithms are set forth herein as comprising one or more "steps." Such steps are not required to be performed in any particular order except as mandated by logic or as specifically set forth in the claims.

What is claimed is:

1. A search result ranking system comprising:
a processor and a memory, the processor configured to:
receive a set of responsive documents generated from a search executed on a plurality of electronically-readable documents based on a search query, the set of responsive documents comprising one or more documents associated with a first category and one or more documents associated with a second category;
rank the responsive documents within the set, wherein ranking the responsive documents comprises applying a plurality of ranking models to the responsive documents, each of the plurality of ranking models associated with a respective category;
create an ordered list of documents according to the plurality of ranking models, wherein an initial subpart of the ordered list comprises at least a respective highest-ranked document according to each of the plurality of ranking models; and
output the ordered list responsive to the search query.

2. The search result ranking system of claim 1, wherein applying the plurality of ranking models to the set of responsive documents comprises:
applying a first of the plurality of ranking models to each document in the set of responsive documents.

3. The search result ranking system of claim 2, wherein applying the plurality of ranking models to the set of responsive documents comprises:
applying a second of the plurality of ranking models to each document in the set of responsive documents.

4. The search result ranking system of claim 1, wherein applying the plurality of ranking models to the set of responsive documents comprises:
applying a first of the plurality of ranking models to a respective multi-modal vector model associated with each document in the set of responsive documents.

5. The search result ranking system of claim 4, wherein the multi-modal vector model associated with a particular document comprises:
a feature vector model portion calculated based on one or more features of an entity that are included in the document; and
a description vector model component calculated based on a narrative description of the entity that is included in the document.

6. The search result ranking system of claim 5, wherein the multi-modal vector model associated with the particular document further comprises an image vector model component calculated based on an image of the entity that is included in the document.

7. The search result ranking system of claim 6, wherein the multi-modal vector model comprises a concatenation of the feature vector model, the description vector model, and the image vector model.

8. The search result ranking system of claim 1,
wherein the set of responsive documents further comprises one or more documents associated with a third category;
wherein applying the plurality of ranking models further comprises:
applying a third of the plurality of ranking models to the set of responsive documents, the third ranking model associated with the third category.

9. The search result ranking system of claim 1, wherein the processor is configured to:
receive a sorting criterion from a user;
segregate the responsive documents by ranking into at least two groups;
sort the responsive documents within each group according to the sorting criterion;
create a sorted list in which the sorted documents within a first one of the groups are included before the sorted documents within a second one of the groups; and
return the sorted list to the user.

10. A non-transitory computer-readable storage medium having stored thereon instructions, which, when executed by a processor, cause the processor to perform operations comprising:
obtaining a set of user search queries, wherein each user search query in the set of user search queries is the same as or similar to each other user search query in the set of user search queries;
obtaining a respective list of documents returned by a search engine responsive to each user search query in the set of user search queries;
obtaining a set of user selections of one or more of the documents in each respective list of documents and associating respective user selections of documents with respective user search queries;
determining that one or more documents within the set of documents are associated with a first category;
determining that one or more documents within the set of documents are associated with a second category;
training a plurality of document ranking models for the first category and the second category based on the respective user selections of documents associated with respective user searches; and
storing the plurality of document ranking models for use in ranking results of further user searches with the search engine that are similar to the set of user searches.

11. The non-transitory computer-readable storage medium of claim 10, further comprising:
receiving a further search query from a user;
determining that the further search query is the same as or similar to the set of user search queries;
receiving further results from a search engine to the further search query;
applying the plurality of ranking models to the further results to create an ordered list of the further results; and
returning the ordered list of the further results, responsive to the further search query, based on the plurality of ranking models.

12. The non-transitory computer-readable storage medium of claim 11, further comprising:
receiving a sorting criterion from the user;
segregating the further results by ranking into at least two groups; and
sorting the ordered list of the further results within each group according to the sorting criterion.

13. The non-transitory computer-readable storage medium of claim 10, wherein training the plurality of document ranking models for the first category based on the respective user selections of documents associated with respective user searches comprises:
designating a first subset of documents associated with the first category as positive examples;
designating a second subset of documents that are not associated with the first category as negative examples; and
training the first document model based on the positive examples and the negative examples.

14. The non-transitory computer-readable storage medium of claim 10, wherein the set of user search queries is a first set of user search queries, further comprising:
obtaining a second set of user search queries, wherein each user search query in the second set of user search queries is the same as or similar to each other user search query in the second set of user search queries, and wherein each user search query in the second set of user search queries is different from each user search query in the first set of user search queries;
obtaining a second respective list of documents returned by the search engine responsive to each user search query in the second set of user search queries;
obtaining a second set of user selections of one or more of the documents in each respective list and associating respective second user selections of documents with respective user search queries;
determining that one or more documents within the second set of documents are associated with a third category;
determining that one or more documents within the second set of documents are associated with a fourth category;
training a plurality of document ranking models for the third category and the fourth category based on the respective second user selections of documents associated with respective second user searches; and storing the plurality of document ranking models for use in ranking results of further user searches with the search engine that are similar to the second set of user searches.

15. The non-transitory computer-readable storage medium of claim 14, further comprising:

receiving a further search query from a user;

determining that the further search query is the same as or similar to the second set of user search queries;

receiving further results from a search engine to the further search query;

applying the plurality of ranking models to the further results to create a second ordered list of the further results; and returning the second ordered list of the further results, responsive to the further search query, based on the plurality of ranking models.

16. The non-transitory computer-readable storage medium of claim 10, further comprising:

calculating a vector model for each document in each respective list of documents;

wherein training the plurality of ranking models is further based on the respective vector models for the documents in each respective list of documents.

17. The non-transitory computer-readable storage medium of claim 16, wherein calculating the vector model for a particular document comprises:

calculating a feature vector model portion based on one or more features of an entity that are included in the particular document; and calculating a description vector model portion calculated based on a narrative description of the entity that is included in the particular document.

18. The non-transitory computer-readable storage medium of claim 17, wherein calculating the vector model a particular document comprises calculating an image vector model portion based on an image of the entity that is included in the particular document.

19. A search result ranking system comprising:

a processor and a memory, the processor configured to:

train a plurality of ranking models for each of a plurality of training search queries based on a multi-modal vector model calculated for each of a plurality of electronic documents and based on user behavior responsive to a plurality of search results, each ranking model specific to a category;

receive a further search query from a user;

determine that the further search query is the same as or similar to one of the training search queries;

receive, from a search engine, a list of documents that are responsive to the further search query;

apply the plurality of ranking models associated with the one of the training search queries to the list to create a ranked list of the responsive documents; and return the ranked list of the responsive documents to the user.

20. The search result ranking system of claim 19, wherein the processor is further configured to:

calculate a feature vector model portion based on one or more features of an entity that are included in a particular document;

calculate a description vector model portion calculated based on a narrative description of the entity that is included in the particular document;

calculate an image vector model portion based on an image of the entity that is included in the particular document; and combine the feature vector model portion, the description vector model portion, and the image vector model portion into the multi-modal vector model for the particular document.

\* \* \* \* \*